United States Patent [19]
Abbott

[11] Patent Number: 5,959,575
[45] Date of Patent: Sep. 28, 1999

[54] INTERIOR GPS NAVIGATION

[75] Inventor: Anthony Steven Abbott, Rancho Palos Verdes, Calif.

[73] Assignee: Nortrhop Grumman Corporation, Los Angeles, Calif.

[21] Appl. No.: 08/964,083

[22] Filed: Nov. 4, 1997

[51] Int. Cl.⁶ ..................................................... G01S 5/02
[52] U.S. Cl. ..................................... 342/357.06; 701/213
[58] Field of Search ............................... 342/257, 357.06; 701/213

[56] References Cited

U.S. PATENT DOCUMENTS

| | | | |
|---|---|---|---|
| 4,866,450 | 9/1989 | Chisholm | 342/410 |
| 4,975,707 | 12/1990 | Smith | 342/357 |
| 4,983,980 | 1/1991 | Ando | 342/357 |
| 5,059,969 | 10/1991 | Sakaguchi et al. | 342/352 |
| 5,177,490 | 1/1993 | Ando et al. | 342/357 |
| 5,311,194 | 5/1994 | Brown | 342/357 |
| 5,361,212 | 11/1994 | Class et al. | 364/428 |
| 5,502,641 | 3/1996 | Isomura | 364/449 |
| 5,512,902 | 4/1996 | Guthrie et al. | 342/357 |
| 5,568,162 | 10/1996 | Samsel et al. | 343/842 |
| 5,572,216 | 11/1996 | Weinberg et al. | 342/357 |
| 5,686,924 | 11/1997 | Trimble et al. | 342/357 |
| 5,784,028 | 7/1998 | Corman et al. | 342/357 |
| 5,815,114 | 9/1998 | Speast et al. | 342/357 |

*Primary Examiner*—Mark Hellner
*Attorney, Agent, or Firm*—Terry J. Anderson; Karl J. Hoch, Jr.

[57] ABSTRACT

A method for indoor navigation is disclosed. The method comprises the following steps: (a) disposing a plurality of ground transceivers in proximity of an indoor area to be navigated through; (b) transmitting from each of the ground transceivers a pseudo-satellite signal which includes positional coordinates of the ground transceiver and an assigned PRN code sequence modulated on an L-band carrier signal having a frequency approximately equal to an L1 frequency of global positioning system (GPS) satellite signals, the assigned PRN code sequence being different from PRN code sequences that are included in GPS satellite signals; (c) receiving the pseudo-satellite signals with a receiver circuit of a mobile GPS receiver, the receiver circuit including a code generator circuit for producing internal PRN code sequences; (d) comparing the internal PRN code sequences with PRN code sequences included in the pseudo-satellite signals to derive decoded pseudo-satellite signals, using a decoder circuit of the mobile GPS receiver; (e) processing the decoded pseudo-satellite signals using a processing circuit of the mobile GPS receiver; and (f) deriving positional coordinates of the mobile GPS receiver from the processed decoded pseudo-satellite signals.

17 Claims, 4 Drawing Sheets

MOBILE GPS RECEIVER BLOCK DIAGRAM

MOBILE GPS RECEIVER BLOCK DIAGRAM

INTERIOR GPS NAVIGATION

FIELD OF THE INVENTION

The present invention relates generally to a navigation system using the satellite-based Global Positioning System (GPS) and more particularly to a navigation system in which a GPS receiver can track signals other than GPS satellite signals, without any change to its existing hardware, to navigate inside buildings where it can no longer track GPS satellite signals.

BACKGROUND OF THE INVENTION

It is well known that the signals transmitted by the Global Positioning System (GPS) satellites can be used by a GPS receiver for navigation. In order to effectively operate a navigation system using the GPS satellite signals, we need to have at least four satellites in view at all times. This is almost never a problem in the open view. However, since the GPS satellite signals are weak microwave signals (1575.42 MHZ and 1227.6 MHZ), they cannot penetrate through obstacles. Thus, if the GPS receiver antenna is surrounded by tall structures or inside a building, there is no direct line-of-sight reception of the satellite signals. In such a case, navigation using the GPS satellite signals is not possible.

There are future applications where there will be a need to navigate inside buildings. One example is the location tracking of a portable valuable object that may be inside or outside a building. Currently, location tracking of railroad cars and buses are being effected with GPS receivers attached to them. As the price and size of GPS receivers decrease, it will be feasible to attach a GPS receiver to any small movable object of high value. This will be a future method for keeping track of the location of valuable objects or to find an object of interest inside or outside a building. It will be possible to locate the object of interest by simply interrogating the attached GPS receiver and having it send its positional coordinates over a radio link. The GPS receiver can retain coordinates of its last position or compute coordinates of its new position when interrogated. This will be particularly useful for locating a missing object. Presently, this cannot be done if the GPS receiver is inside a building because it cannot track the weak GPS satellite signals indoors. It is desirable to use the same GPS receiver that tracks GPS satellite signals outdoors to also track similar signals indoors, since this would not require a hardware change of the existing GPS receiver.

The present invention proposes a system for navigating inside a building using an existing GPS receiver. Since this system is based on the same positioning method that underlies a standard GPS navigation system, an understanding of how the GPS satellite signals are used for navigation is needed. The following discussion will provide the background.

The Global Positioning System (GPS) is a satellite-based navigation system implemented and controlled by the U.S. Department of Defense. The GPS has three segments: the Space Segment consisting of the GPS satellites, the Control Segment consisting of a Master Control station located in Colorado and monitor stations located around the world, and the User Segment consisting of the GPS receivers. Currently, the GPS Space Segment consists of 24 satellites or space vehicles (SVs): 21 navigational SVs and 3 active spare SVs orbiting the earth in 12-hour orbits. The orbit altitude (about 20,200 km above the earth) is such that the SVs repeat the same track and configuration over any point approximately every 24 hours (4 minutes earlier each day). There are six orbital planes (with nominally four SVs in each), equally spaced (60 degrees apart), and inclined at about 55 degrees with respect to the equatorial plane. This constellation provides a user with five to eight SVs visible from any point on the earth.

The satellites continuously send signals down toward the earth in the form of radio waves. If a user is equipped with a GPS receiver and if enough GPS satellite signals are penetrating the local surroundings, the user is able to determine his location by extracting positional information from the GPS satellite signals. For military reasons, the Department of Defense purposely degrades the accuracy of the GPS positional information by making the signals from any GPS satellite vary with time, introducing errors of as much as 100 meters in a 30 second period. This degradation is called Selective Availability which has been adopted primarily to prevent terrorists from using GPS as a bombing aid.

GPS satellites transmit information on two carrier signals: L1 band centered at 1575.42 MHZ and L2 band centered at 1227.6 MHZ. Each satellite has four atomic clocks, one is for timing and synchronization while the other three are for redundancy in case of failure. The timing clock ticks at the basic frequency of 10.23 MHZ. This basic frequency is multiplied by 154 and 120 to generate the frequencies of L1 and L2 carrier signals respectively. The L1 carrier signal is then modulated by three binary signals: a Coarse Acquisition (C/A) code, a Precision (P) code, and a Navigation Message signal. The C/A code and the P-code are pseudo-random noise (PRN) code sequences, i.e., noise-like signals. The P-code is a very long (about seven days) 10.23 MHZ PRN code sequence available for military use while the C/A code is a 1.023 MHZ PRN code sequence available for civil navigation. The Navigation Message is a 50 Hz signal which includes the ephemeris which provides orbital information of the satellite in question, clock information and other data related to the GPS satellite constellation.

If the clocks provided in the GPS satellites and the clock in a GPS receiver located at a survey point are synchronized with each other, the propagation delay time of the GPS radio waves transmitted by a GPS satellite is the difference between the time at which they are transmitted and the time at which they are received by the GPS receiver. By multiplying this propagation delay time by the speed of light, the distance between the survey point and the corresponding satellite can be calculated. With the knowledge of this distance and the three-dimensional coordinates of the satellite, derived from the ephemeris of its C/A code, the survey point can be pictured as a point located somewhere on the surface of an imaginary sphere having as center the position of the satellite and as radius the distance between the satellite and the survey point. With two satellites, there are two such imaginary spheres, and the survey point can be pictured as a point located somewhere on the circle where the two spheres intersect. With three satellites, there are three corresponding imaginary spheres which intersect at two locations. One of the locations is the correct answer for the position of the survey point, the other location would put the survey point at an impossible altitude or would indicate that the survey point is moving at an impossible velocity. Thus, theoretically we could disregard one of the two locations and proceed with only measurements from three satellites. However, due to inherent imperfect synchronization between the satellites' clocks and the GPS receiver's clock, measurements from four satellites are needed. With four satellites, there are four imaginary spheres which intersect each other at a single location, and the three-dimensional coordinates of the survey point can be calculated as the coordinates of that location.

The above positioning method provides position information with an accuracy of approximately 100 meters which includes the effect of Selective Availability. Differential GPS is a technique which uses differential corrections to obtain an accuracy of 2 to 5 meters. An accuracy of 1 meter can be achieved by using Differential GPS in conjunction with a state estimator such as a Kalman filter. Very high accuracy can be obtained with a more complex technique called Carrier Phase.

To implement the Differential GPS technique, there must be a fixed known location called the reference point or base. When the base computes its position from the GPS satellite signals, it compares the solution to the known reference values and transmits the error via some wireless communication link. A GPS user out on the road receives these differential corrections and adds them to its own computed solution to obtain more accurate positional coordinates. This Differential GPS technique works because the satellites are so far above the earth that positional errors measured by one GPS receiver are almost exactly the same for any other GPS receiver in a relatively small area.

SUMMARY OF THE INVENTION

The present invention discloses a method for indoor navigation. The method comprises the following steps: (a) disposing a plurality of ground transceivers in proximity of an indoor area to be navigated through; (b) transmitting from each of the ground transceivers a pseudo-satellite signal which includes positional coordinates of the ground transceiver and an assigned PRN code sequence modulated on an L-band carrier signal having a frequency approximately equal to an L1 frequency of global positioning system (GPS) satellite signals, the assigned PRN code sequence being different from PRN code sequences that are included in GPS satellite signals; (c) receiving the pseudo-satellite signals with a receiver circuit of a mobile GPS receiver, the receiver circuit including a code generator circuit for producing internal PRN code sequences; (d) comparing the internal PRN code sequences with PRN code sequences included in the pseudo-satellite signals to derive decoded pseudo-satellite signals, using a decoder circuit of the mobile receiver; (e) processing the decoded pseudo-satellite signals using a processing circuit of the mobile receiver; and (f) deriving positional coordinates of the mobile receiver from the processed decoded pseudo-satellite signals.

In the presently preferred embodiment of the invention, the system for indoor navigation comprises four ground transceivers disposed in proximity of an indoor area to be navigated through and a mobile GPS receiver. One of the ground transceivers is positioned at a fixed known location to serve as a reference ground transceiver. Each of the four ground transceivers receives GPS satellite signals using a receiver circuit which includes a code generator circuit for producing internal pseudo-random noise (PRN) code sequences. A decoder circuit of the ground transceiver compares the internal PRN code sequences with PRN code sequences included in the GPS satellite signals to derive decoded GPS satellite signals. A processing circuit of the ground transceiver processes the decoded pseudo-satellite signals and derives positional coordinates of the ground transceiver. The reference ground transceiver computes differential GPS position correction information by calculating differences between positional coordinates of the reference ground transceiver as derived from the decoded GPS satellite signals and positional coordinates of the reference ground transceiver as determined by the fixed known location and transmits it to the other ground transceivers to correct their positional coordinates as derived from the received GPS satellite signals. Each of the four ground transceivers transmits a pseudo-satellite signal. Each pseudo-satellite signal comprises a navigation message portion, which includes the positional coordinates of the corresponding ground transceiver and the time at which the pseudo-satellite signal is transmitted, and an assigned PRN code sequence. The navigation message portion and the assigned PRN code sequence are modulated on an L-band carrier signal having a frequency approximately equal to an L1 frequency of global positioning system (GPS) satellite signals. The assigned PRN code sequence is different from PRN code sequences that are included in GPS satellite signals. The mobile GPS receiver receives the pseudo-satellite signals using a receiver circuit which includes a code generator circuit for producing internal PRN code sequences. A decoder circuit of the mobile receiver compares the internal PRN code sequences with PRN code sequences included in the pseudo-satellite signals to derive decoded pseudo-satellite signals. A processing circuit of the mobile receiver processes the decoded pseudo-satellite signals and derives positional coordinates of the mobile receiver.

Another embodiment of the present invention is a system for precision landing for an aircraft utilizing global positioning system (GPS) signals transmitted by a plurality of GPS satellites, preferably four satellites, orbiting the earth. The system comprises a plurality of ground transceivers, preferably four ground transceivers, including a reference ground transceiver positioned at a fixed known location and a GPS receiver. Each of the ground transceivers receives the GPS satellite signals to determine its own positional coordinates. The reference ground transceiver computes differential GPS position correction information by calculating differences between positional coordinates of the reference ground transceiver as derived from the decoded GPS satellite signals and positional coordinates of the reference ground transceiver as determined by the fixed known location and transmits it to the other ground transceivers to correct their positional coordinates as derived from the received GPS satellite signals. Each of the four ground transceiver transmits a pseudo-satellite signal. Each pseudo-satellite signal comprises a navigation message, which includes the positional coordinates of the corresponding ground transceiver and the time at which the pseudo-satellite signal is transmitted, and an assigned PRN code sequence. The navigation message portion and the assigned PRN code sequence are modulated on an L-band carrier signal having a frequency approximately equal to an L1 frequency of global positioning system (GPS) satellite signals. The assigned PRN code sequence is different from PRN code sequences that are included in GPS satellite signals.

The GPS receiver, positioned on the aircraft, includes a receiver circuit which receives the GPS satellite signals when the aircraft is far from a landing location and receives the pseudo-satellite signals when the aircraft is near the landing location. The receiver circuit includes a code generator circuit for producing internal PRN code sequences which comprise PRN code sequences included in the GPS satellite signals and PRN code sequences included in the pseudo-satellite signals. A decoder circuit of the mobile receiver compares the internal PRN code sequences with the PRN code sequences included in the received signals to derive either decoded GPS satellite signals or decoded pseudo-satellite signals. A processing circuit of the mobile receiver processes the decoded GPS satellite signals and derives positional coordinates of the GPS receiver, when the aircraft is far from the landing location. When the aircraft is near the landing location, the processing circuit of the mobile receiver processes the decoded pseudo-satellite signals and derives positional coordinates of the GPS receiver.

DETAILED DESCRIPTION OF THE INVENTION

The detailed description set forth below in connection with the appended drawings is intended as a description of the presently preferred embodiments of the invention, and is not intended to represent the only forms in which the present invention may be constructed or utilized. The description sets forth the functions and the sequence of the steps for constructing and operating the invention in connection with the illustrated embodiments. It is to be understood, however, that the same or equivalent functions may be accomplished by different embodiments that are also intended to be encompassed within the spirit and scope of the invention.

The interior GPS navigation system of the present invention is comprised preferably of four ground transceivers and a mobile receiver. Each ground transceiver is a ground-based transmitter equipped with an internal GPS receiver. The mobile receiver is a GPS receiver operative to track GPS satellite signals when it is outdoors. It is preferable that the mobile receiver is also a transmitter capable of sending its coordinates over a radio link when it is interrogated.

Figure 1:
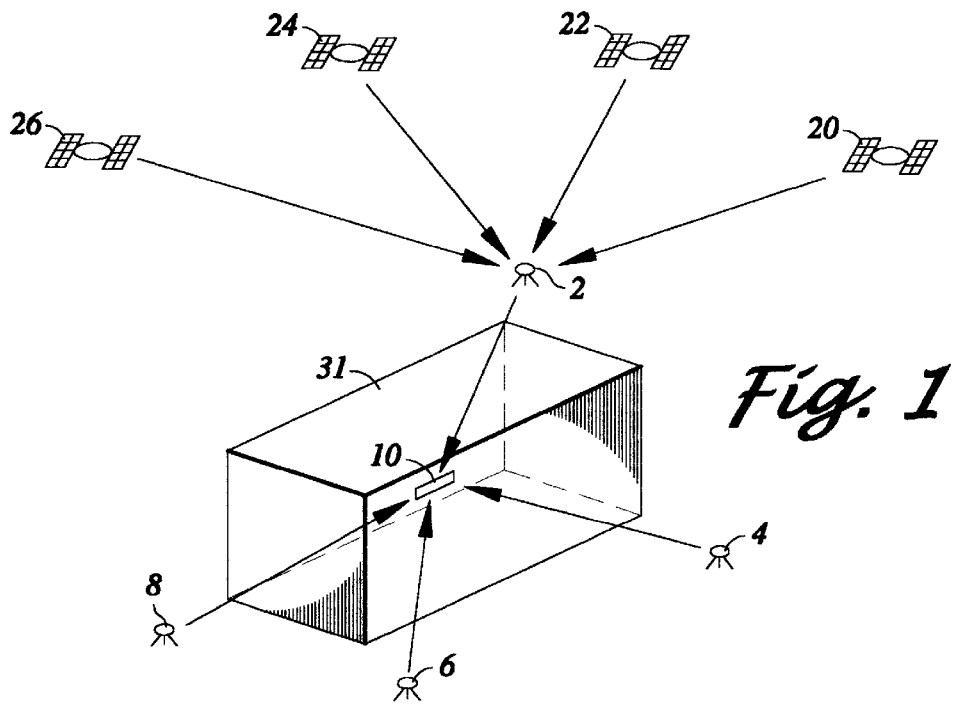
FIG. 1 illustrates a preferred embodiment of the present invention comprising four ground transceivers located near a building and a mobile receiver located inside the building.

FIG. 1 illustrates four ground transceivers 2, 4, 6, 8 and a mobile GPS receiver 10 which is located inside a building 31. Each ground transceiver is equipped with an internal GPS receiver to receive the L1 signals from the four GPS satellites 20, 22, 24, 26 and a transmitter to transmit a pseudo-satellite signal.

Figure 2:
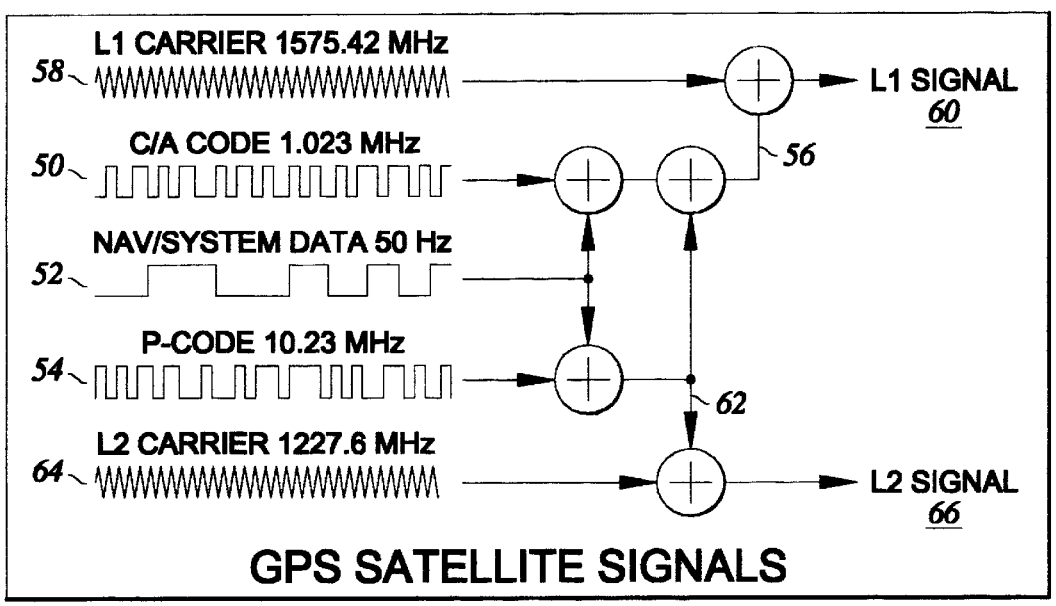
FIG. 2 shows how the GPS satellite signals are generated.

FIG. 2 shows how the GPS satellite signals are generated. The Coarse Acquisition (C/A) code 50 is combined with the navigation data signal 52 and the Precision code (P-code) 54 by the binary function Exclusive-OR. The resulting signal 56 of the combination modulates the L1 carrier signal 58 to generate the L1 signal 60. The C/A code signal 50 is a 1.023 MHZ noise-like signal which repeats every 1023 bits, i.e., every 1.023 milliseconds. A distinct C/A code signal is assigned to each of the ground transceivers, thus serves as a unique identifier of a ground transceiver. The navigation data signal 52 is a 50 Hz signal which includes ephemeris data of the corresponding satellite and other data relating to the GPS satellite constellation.

The P-code 54 is combined with the navigation data signal 52 by the binary function Exclusive-OR. The resulting signal 62 of this combination modulates the L2 carrier signal 64 to produce the L2 signal 66, which is further encrypted and available only to authorized users with cryptographic equipment and keys. The present invention only concerns with the L1 signal 60, which is available to civil GPS users.

Figure 3:
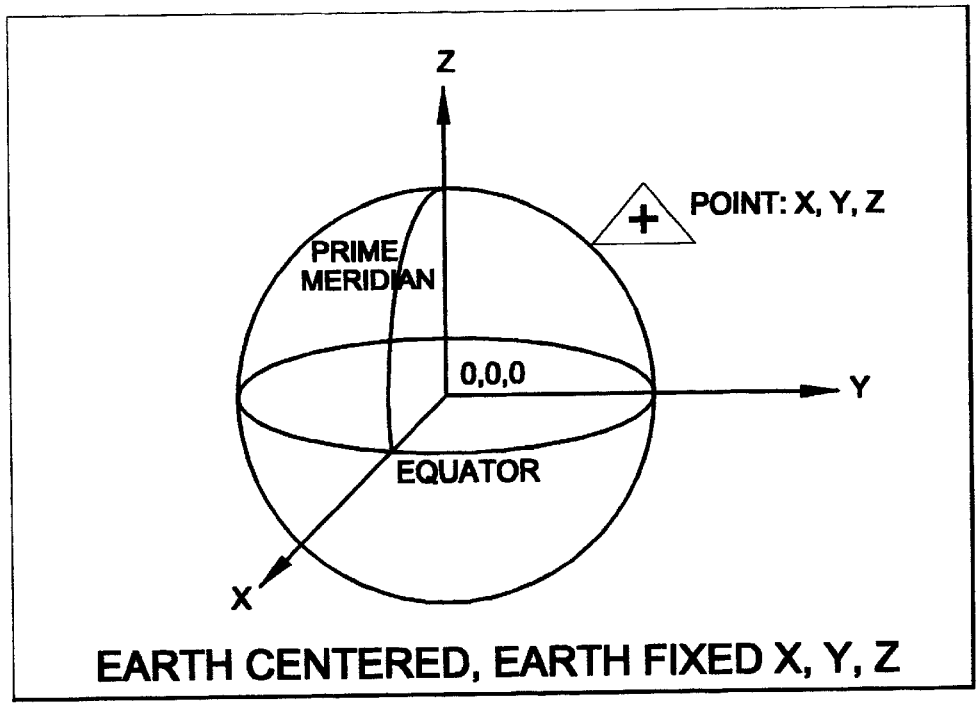
FIG. 3 illustrates the earth-centered, earth-fixed coordinate system.

Referring to FIG. 1, each of the ground transceivers 2, 4, 6, 8 computes its own positional coordinates from the information in the L1 signals transmitted by the four satellites 20, 22, 24, 26. The computed positional coordinates are in the earth-centered, earth-fixed coordinate system as shown in FIG. 3.

In each ground transceiver, there are a receiver antenna to receive the GPS satellite signals and a transmitter antenna to transmit a pseudo-satellite signal. If the receiver antenna and the transmitter antenna of a ground transceiver are not coincident, then the ground transceiver coordinates are adjusted by the distance of the lever arm from the receiver antenna to the transmitter antenna.

The ground transceiver 2 is positioned at a fixed known location and serves as a reference to compute the differential GPS position correction. Due to its fixed known location, the ground transceiver 2 knows its own positional coordinates with very high accuracy. From this knowledge of its accurate positional coordinates and its coordinates as computed from the GPS satellite signals, the ground transceiver 2 computes the differential GPS position correction information and transmits it to the other ground transceivers 4, 6, 8. Each of the ground transceivers 4, 6, 8 computes its own positional coordinates from the GPS satellite signals received from the satellites 20, 22, 24, 26, and uses the differential GPS position correction information received from the ground transceiver 2 to correct its computed positional coordinates. This concept of using the differential GPS position correction information from one ground transceiver to calibrate the positional solutions of the other ground transceivers works because the satellites are so far above the earth that positional errors measured by one GPS receiver are almost exactly the same for any other GPS receiver in a relatively small area. Since the ground transceivers are stationary, their coordinates need only be solved for once and used thereafter.

Each ground transceiver transmits a pseudo-satellite signal which includes two types of information: accurate time of transmission and positional coordinates of the transmitting ground transceiver. The signal transmitted by each ground transceiver has a format identical to that of a GPS satellite signal except that it comprises a different PRN code than the ones currently used by the satellites, and the positional coordinates of the ground transceiver in the 50 bits-per-second (bps) navigation message instead of the satellite ephemeris. The PRN codes which are currently unused by the satellites are codes 32, 33, 34, 35, 36, 37. The power of the transmitted signals could be made strong enough to guarantee reception by the mobile GPS receiver 10 anywhere in the building 31.

Figure 4:
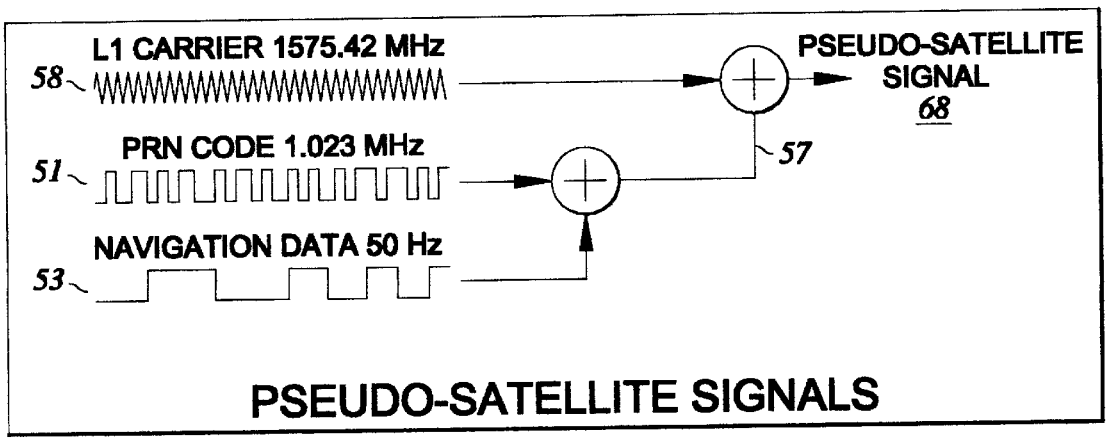
FIG. 4 shows how the pseudo-satellite signals are generated.
Figure 5:
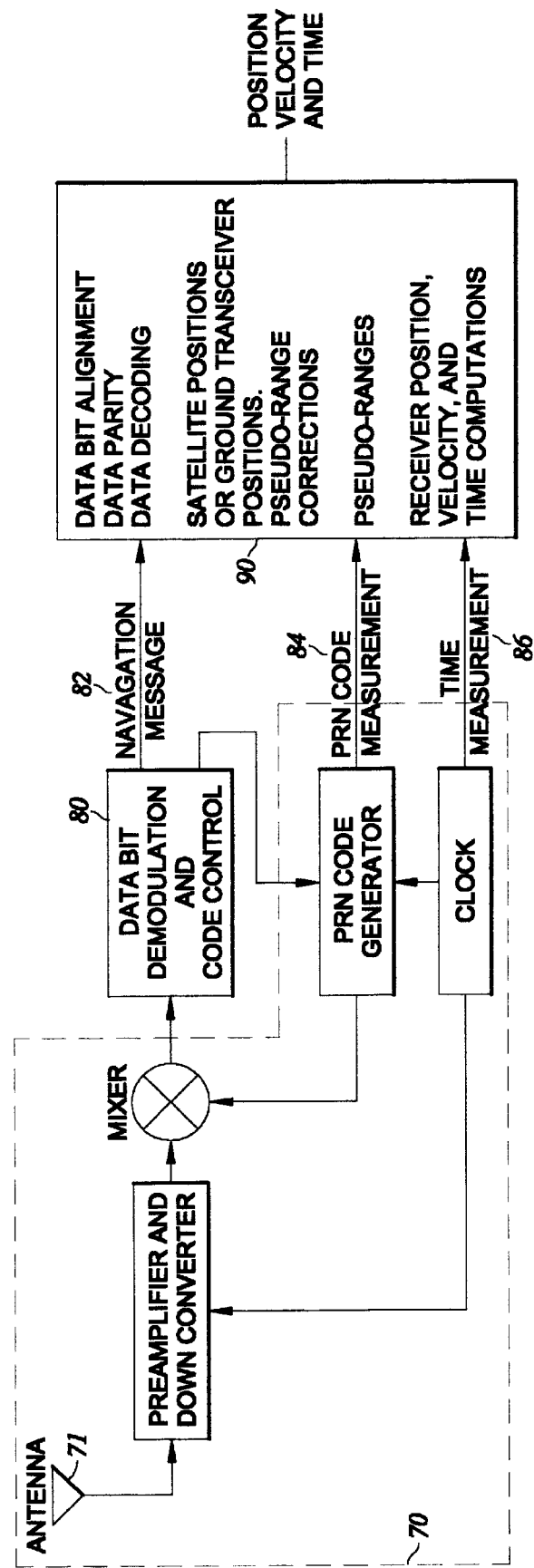
FIG. 5 is a block diagram of a mobile GPS receiver.

FIG. 4 shows how a pseudo-satellite signal 68 is generated. A pseudo-random noise (PRN) code signal 51, different from any of the C/A code signals used by the GPS satellites, is combined with the navigation data signal 53 by the binary function Exclusive-OR. The resulting signal 57 of this combination modulates an L1 carrier signal 58 to generate the pseudo-satellite signal 68. The PRN code signal 51 is a 1.023 MHZ noise-like signal which repeats every 1023 bits, i.e., every 1.023 milliseconds. A distinct PRN code is assigned to each of the ground transceivers, thus serves as a unique identifier of a ground transceiver. The navigation data signal 53 is a 50 Hz signal which includes positional coordinates of the corresponding ground transceiver and the time of transmission of the signal.

Referring to FIG. 1, the mobile GPS receiver 10 is a GPS receiver which is operative to navigate outdoors by tracking the GPS satellite signals from the four satellites 20, 22, 24, 26 and using triangulation method to compute its positional coordinates.

Inside the building 31, the mobile GPS receiver 10 can no longer track the weak microwave GPS satellite signals. The mobile GPS receiver 10 can then search and track the pseudo-satellite signals transmitted by the four ground transceivers 2, 4, 6, 8 to navigate indoors, as follows. The mobile GPS receiver 10 includes a receiver circuit 70 which receives a signal at its antenna 71. The receiver circuit 70 includes a code generator circuit 75 which generates internal PRN code sequences. The internal PRN code sequences comprise C/A code sequences included in the GPS satellite signals and the PRN code sequences that are assigned to the four ground transceivers 2, 4, 6, 8. The internal PRN code sequences are then compared with the signal received by the antenna 71. As the number of matches starts to increase, a particular ground transceiver's PRN code is found. Once the PRN code is found, the pseudo-satellite signal is demodulated by the decoder circuit 80 to obtain the navigation message 82. The processing circuit 90 uses the PRN code measurement 84 to distinguish between GPS satellite signals and pseudo-satellite signals. For example, if the PRN code measurement 84 corresponds to either one of the PRN code sequences numbered 32 through 37, i.e., the currently unused code sequences in the GPS satellite system, then the processing circuit 90 will treat the navigation message 82 as coming from a pseudo-satellite signal. The processing circuit 90 uses the navigation message 82, the PRN code measurement 84, and the time measurement 86 to compute positional coordinates of the corresponding ground transceiver. When all the four ground transceivers 2, 4, 6, 8 are tracked, the mobile GPS receiver 10 can then use triangulation method, as discussed in the Background of the Invention section, to solve for its own positional coordinates.

To decode the 50 Hz navigation message 82 modulated on the pseudo-satellite signal of a particular ground transceiver, there must be a software change to the processing circuit 90 of the mobile GPS receiver 10 so that it can switch from computing the positional coordinates of a satellite to computing the positional coordinates of a ground transceiver. This is a relatively simple software change to the mobile GPS receiver 10. The rest of the mobile GPS receiver 10 remains identical to a standard GPS receiver. The present invention does not require any hardware change to a standard GPS receiver since the ground transceivers 2, 4, 6, 8 are transmitting at the same frequency as the satellites. The software to decode the 50 Hz navigation data to obtain positional coordinates of a ground transceiver already existed in the early phase of the GPS system. In Phase I of the GPS system, before the satellites were operating, ground transceivers were used to test Phase I GPS user receivers. Thus, that part of Phase I GPS receiver software which provides special processing for the pseudo-satellite signals could be resurrected to be used in the present invention. Phase I GPS receiver software is owned by the U.S. Government, and was known as the X-set software.

Figure 6:
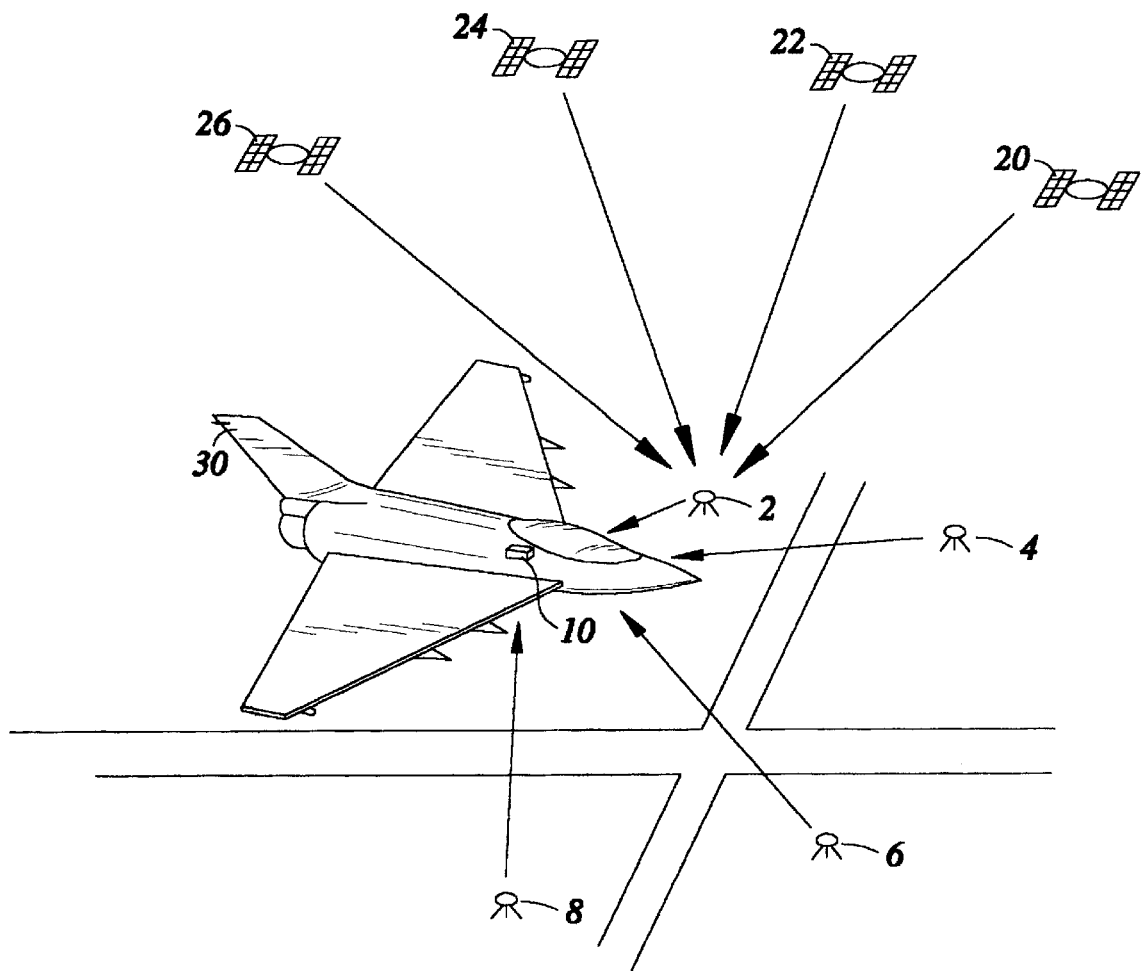
FIG. 6 illustrates another embodiment of the present invention comprising four ground transceivers located near a runway and a receiver onboard an approaching aircraft.

Another embodiment of the present invention is depicted in FIG. 6. FIG. 6 illustrates a system for precision landing for an aircraft utilizing global positioning system (GPS) signals transmitted by a plurality of GPS satellites orbiting the earth and pseudo-satellite signals transmitted by four ground transmitters. The system comprises four ground transceivers 2, 4, 6, 8 including a reference ground transceiver 2 positioned at a fixed known location and a GPS receiver 10 onboard an aircraft 30. Each of the ground transceivers 2, 4, 6, 8 receives the GPS satellite signals from the four satellites 20, 22, 24, 26 and uses triangulation method to derive its own positional coordinates. The reference ground transceiver 2 computes and transmits differential GPS position correction information to other ground transceivers 4, 6, 8 to correct their positional coordinates as derived from the GPS satellite signals, for enhanced accuracy. Each ground transceiver transmits a pseudo-satellite signal. Each pseudo-satellite signal comprises a navigation message, which includes the positional coordinates of the corresponding ground transceiver and the time at which the pseudo-satellite signal is transmitted. The GPS receiver 10, positioned on the aircraft 30, tracks the GPS satellite signals from the satellites 20, 22, 24, 26 to navigate while being far from a landing location, preferably at a distance of more than 2000 feet, then tracks only the pseudo-satellite signals transmitted by the ground transceivers 2, 4, 6, 8 to navigate while being near the landing location 40, preferably at a distance of less than 2000 feet. Since the pseudo-satellite signals are transmitted at the same frequency as the satellite signals, the GPS receiver 10 hardware does not require any modification from what is in normal use at present time.

Only a software change is required to provide special processing for the pseudo-satellite signals. The software used in the Phase I GPS user equipment could be used for this software change. Although the ground transceivers 2, 4, 6, 8 transmit at the same frequency as the satellites 20, 22, 24, 26, interference with the satellite signals is not a problem for the approaching aircraft since the aircraft does not track the real GPS satellite signals in addition to the pseudo-satellite signals when it is in the vicinity of the landing location. Signal interference could be a problem for another GPS user who is trying to navigate with the real satellite signals in the vicinity of the runway. However, this would only be a local effect in the vicinity of the runway since the pseudo-satellite signal power at a particular location is reduced by the square of the distance from the ground transceiver transmitter antenna to the particular location.

It is understood that the exemplary interior GPS navigation system described herein and shown in the drawings represents only presently preferred embodiments of the invention. Indeed, various modifications and additions may be made to such embodiments without departing from the spirit and scope of the invention. For example, the ground transceivers need not be positioned outside a building as illustrated; they can be positioned inside a building at favorable locations where there is direct line-of-sight reception of the satellite signals. Also, there need not be four ground transceivers, three ground transceivers are satisfactory for most applications. Those skilled in the art will recognize that various other physical configurations are equivalent and therefore likewise suitable. Thus, these and other modifications and additions may be obvious to those skilled in the art and may be implemented to adapt the present invention for use in a variety of different applications.

What is claimed is:

1. A method for indoor navigation, the method comprising the steps of:

(a) generating pseudo-satellite signals from a plurality of pseudo-satellite ground transceivers, said method of generating said pseudo-satellite signals comprising the steps of:

(1) generating a signal having a unique code for each around transceiver;

(2) combining said signal with navigation data of the transceiver to generate a resulting signal; and (3) modulating said resulting signal within a carrier band to generate the pseudo-random satellite signals;

(b) transmitting from each of the ground transceivers said pseudo-satellite signals;

(c) receiving the pseudo-satellite signals with a receiver circuit of a mobile GPS receiver, the receiver circuit including a memory circuit for storing the unique code of the ground transceivers;

(d) comparing the stored codes with the pseudo-satellite signals to derive decoded pseudo-satellite signals, using a decoder circuit of the mobile GPS receiver;

(e) processing the decoded pseudo-satellite signals using a processing circuit of the mobile GPS receiver; and (f) deriving positional coordinates of the mobile GPS receiver from the processed decoded pseudo-satellite signals.

2. The method as recited in claim 1 further comprising the steps of:

(a) receiving GPS satellite signals having each a PRN code sequence included therein, at each of the plurality of ground transceivers, with a receiver circuit of the ground transceiver, the receiver circuit including a code generator circuit for producing internal PRN code sequences;

(b) comparing the internal PRN code sequences with PRN code sequences included in the GPS satellite signals to derive decoded GPS satellite signals, utilizing a decoder circuit of the ground transceiver;

(c) processing the decoded GPS satellite signals with a processing circuit of the ground transceiver; and (d) deriving positional coordinates of the ground transceiver from the processed decoded GPS satellite signals.

3. The method as recited in claim 2 further comprising the steps of:

(a) positioning at least one of the ground transceivers at a fixed known location to serve as a reference ground transceiver;

(b) computing differential GPS position correction information by calculating differences between positional coordinates of the reference ground transceiver as determined from information in the GPS satellite signals and positional coordinates of the reference ground transceiver as determined by the fixed known location;

(c) transmitting the differential GPS position correction information from the reference ground transceiver to other ground transceivers in the plurality of ground transceivers; and (d) correcting positional coordinates of each of the ground transceivers as derived from the decoded GPS satellite signals, using the differential GPS position correction information.

4. The method as recited in claim 1 wherein each pseudo-satellite signal comprises a navigation message portion including positional coordinates of a ground transceiver and time at which the pseudo-satellite signal is transmitted by the ground transceiver.

5. A ground-based navigation system for receiving global positioning system (GPS) satellite signals and broadcasting pseudo-satellite signals, the system comprising a plurality of ground transceivers, each of the ground transceivers comprising:

a receiver circuit for receiving GPS satellite signals;

a decoding circuit for decoding the GPS satellite signal;

a processing circuit for processing the decoded GPS satellite signals and deriving therefrom positional coordinates of the ground transceiver;

a pseudo-satellite signal generating circuit comprising:

(a) a signal generation circuit utilizing a unique code for each ground transceiver;

(b) a gate circuit for combining said signal with said decoded GPS satellite signal to generate a resulting signal; and (c) a modulation circuit for combining said resulting signal with a carrier signal to generate the pseudo-satellite signal; and a transmitter circuit for transmitting a pseudo-satellite signal.

6. The system as recited in claim 5 further comprising a mobile GPS receiver utilizing GPS satellite signals for outdoor navigation and utilizing pseudo-satellite signals for indoor navigation, the mobile GPS receiver including:

a receiver circuit for receiving the GPS satellite signals and the pseudo-satellite signals, the receiver circuit including a code generator circuit operative to generate internal PRN code sequences and a decoder circuit for comparing the internal PRN code sequences with PRN code sequences included in the received GPS satellite signals and with PRN code sequences included in the pseudo-satellite signals, the decoder circuit being operative to derive decoded GPS satellite signals and decoded pseudo-satellite signals; and a processing circuit for processing the decoded GPS satellite signals and deriving therefrom positional coordinates of the mobile GPS receiver for outdoor navigation, and for processing the decoded pseudo-satellite signals and deriving therefrom positional coordinates of the mobile GPS receiver for indoor navigation.

7. The system as recited in claim 5 wherein the plurality of ground transceivers comprises at least one reference ground transceiver positioned at a fixed known location, said reference ground transceiver including a reference location circuit for computing differential GPS position correction information by calculating differences between positional coordinates of the reference ground transceiver as derived from the decoded GPS satellite signals and positional coordinates of the reference ground transceiver as determined by the fixed known location, said reference ground transceiver transmitting a differential GPS position correction information signal to other ground transceivers in the plurality of ground transceivers, and wherein each of the ground transceivers comprises a position correction circuit operative to correct positional coordinates of the ground transceiver as derived from the decoded GPS satellite signals.

8. The system as recited in claim 5 wherein each pseudo-satellite signal comprises a navigation message portion including positional coordinates of a ground transceiver and the time at which the pseudo-satellite signal is transmitted by the ground transceiver.

9. The system as recited in claim 6 wherein the mobile GPS receiver further comprises a transmitter circuit for transmitting positional coordinates of the mobile GPS receiver in response to receipt of a querying signal.

10. A method for precision landing for an aircraft utilizing global positioning system (GPS) satellite signals, the GPS satellite signals having each a pseudo-random noise (PRN) code sequence included therein, the method comprising the steps of:

(a) generating pseudo-satellite signals from a plurality of pseudo-satellite ground transceivers, said method of generating said pseudo-satellite signals comprising the steps of:

(1) generating a unique code for each ground transceiver;

(2) combining said signal with navigation data of the transceiver to generate a resulting signal; and (3) modulating said resulting signal within a carrier band to generate the pseudo-random satellite signals;

(b) transmitting from each of the ground transceivers said pseudo-satellite signals;

(c) receiving the GPS satellite signals and the pseudo-satellite signals with a receiver circuit of a GPS receiver positioned on the aircraft, the receiver circuit including a memory circuit for storing the unique code of the ground transceivers;

(d) comparing the stored codes with the received GPS satellite signals to derive decoded GPS satellite signals, and to derive decoded pseudo-satellite signals, using a decoder circuit of the mobile GPS receiver;

(e) processing the decoded GPS satellite signals and deriving therefrom positional coordinates of the receiver for aircraft navigation while being far from the landing location; and (f) processing the decoded pseudo-satellite signals and deriving therefrom positional coordinates of the receiver for aircraft navigation while being near the landing location.

11. The method as recited in claim 10 further comprising the steps of:

(a) receiving the GPS satellite signals at each of the plurality of ground transceivers, with a GPS receiver circuit of the ground transceiver, the GPS receiver circuit including a code generator circuit for producing internal PRN code sequences;

(b) comparing the internal PRN code sequences with PRN code sequences included in the GPS satellite signals to derive decoded GPS satellite signals, utilizing a decoder circuit of the ground transceiver;

(c) processing the decoded GPS satellite signals using a processing circuit of the ground transceiver; and (d) deriving positional coordinates of the ground transceiver from the processed decoded GPS satellite signals.

12. The method as recited in claim 11 further comprising the steps of:

(a) positioning at least one of the ground transceivers at a fixed known location to serve as a reference ground transceiver;

(b) computing differential GPS position correction information by calculating differences between positional coordinates of the reference ground transceiver as derived from the decoded GPS satellite signals and positional coordinates of the reference ground transceiver as determined by the fixed known location;

(c) transmitting the differential GPS position correction information from the reference ground transceiver to other ground transceivers in the plurality of ground transceivers; and (d) correcting positional coordinates of each of the ground transceivers as derived from the decoded GPS satellite signals, using the differential GPS position correction information.

13. The method as recited in claim 10 wherein each pseudo-satellite signal comprises a navigation message portion including positional coordinates of the ground transceiver and time at which the pseudo-satellite signal is transmitted by the ground transceiver.

14. A system for precision landing for an aircraft utilizing global positioning system (GPS) satellite signals, the system comprising:

(a) a plurality of ground transceivers disposed in proximity of a landing location, each of the ground transceivers comprising:

a GPS receiver circuit for receiving GPS satellite signals;

a decoding circuit for decoding the GPS satellite signal;

a processing circuit for processing the decoded GPS satellite signals and deriving therefrom positional coordinates of the ground transceiver;

a pseudo-satellite signal generating circuit comprising:

(a) a signal generation circuit utilizing a unique code for each ground transceiver;

(b) a gate circuit for combining said signal with said decoded GPS satellite signal to generate a resulting signal; and (c) a modulation circuit for combining said resulting signal with a carrier signal to generate the pseudo-satellite signal; and a transmitter circuit for transmitting a pseudo-satellite signal;

a transmitter circuit for transmitting a pseudo-satellite signal; and (b) a GPS receiver positioned on the aircraft, the GPS receiver comprising:

a receiver circuit for receiving the GPS satellite signals and the pseudo-satellite signals, the receiver circuit including a code generator circuit operative to generate internal PRN code sequences and a decoder circuit for comparing the internal PRN code sequences with PRN code sequences included in the received GPS satellite signals and with PRN code sequences included in the received pseudo-satellite signals, the decoder circuit being operative to derive decoded GPS satellite signals and decoded pseudo-satellite signals; and a processing circuit for processing the decoded GPS satellite signals and deriving therefrom positional coordinates of the GPS receiver for aircraft navigation while being far from the landing location, and for processing the decoded pseudo-satellite signals and deriving therefrom positional coordinates of the GPS receiver for aircraft navigation while being near the landing location.

15. The system as recited in claim 14 wherein the ground transceivers comprises at least one reference ground transceiver positioned at a fixed known location, said reference ground transceiver including a reference location circuit for computing differential GPS position correction information by calculating differences between positional coordinates of the reference ground transceiver as derived from the decoded GPS satellite signals and positional coordinates of the reference ground transceiver as determined by the fixed known location, said reference ground transceiver transmitting the differential GPS position correction information to other ground transceivers in the plurality of ground transceivers, and wherein each of the ground transceivers comprises a position correction circuit operative to correct positional coordinates of the ground transceiver as derived from the decoded GPS satellite signals, using the differential GPS position correction information.

16. The system as recited in claim 14 wherein each pseudo-satellite signal comprises a navigation message portion including positional coordinates of a ground transceiver and time at which the pseudo-satellite signal is transmitted by the ground transceiver.

17. A global positioning system (GPS) receiver for navigation in either an orbital satellite GPS environment or a pseudo-satellite local area navigation system environment comprising:

a receiver circuit for accepting carrier band signals from GPS satellite and local area navigation pseudo-satellites;

a comparator circuit for comparing received carrier band signals with stored code sequences to identify the source of the carrier band signal;

a decoder circuit for demodulating said received carrier band signal to generate navigational information; and a processing circuit for calculating the location of the receiver from said navigational information and the source of the carrier band signals.

* * * * *